(12) United States Patent
Smith

(10) Patent No.: US 6,789,345 B1
(45) Date of Patent: Sep. 14, 2004

(54) FISH LURE MAKING SYSTEM

(76) Inventor: Richard F. Smith, 850 Breesport Rd., Erin, NY (US) 14838

( * ) Notice: Subject to any disclaimer, the term of this patent is extended or adjusted under 35 U.S.C. 154(b) by 0 days.

(21) Appl. No.: 10/286,742

(22) Filed: Nov. 1, 2002

(51) Int. Cl.$^7$ ............................................. A01K 85/00
(52) U.S. Cl. .......................................................... 43/4
(58) Field of Search .............................. 43/1, 4, 42.53, 43/55; 24/30.5 R, 30.5 L, 528; 269/130; 53/464, 288.7, 138.7

(56) References Cited

U.S. PATENT DOCUMENTS

| | | | |
|---|---|---|---|
| 876,573 A | * | 1/1908 | Myers ........................ 53/138.7 |
| 2,846,803 A | * | 8/1958 | Rettig .............................. 43/4 |
| 2,847,789 A | * | 8/1958 | Parkman ........................... 43/1 |
| 3,322,544 A | * | 5/1967 | Yakstis ............................. 43/4 |
| 3,886,679 A | | 6/1975 | Marcell |
| 4,188,686 A | | 2/1980 | Baum |
| 4,622,723 A | | 11/1986 | Krauss |
| 4,763,388 A | | 8/1988 | Kemble |
| 4,803,759 A | | 2/1989 | Kemble |
| 5,473,858 A | * | 12/1995 | Hayes ........................... 53/414 |
| 5,771,664 A | * | 6/1998 | Recchia, Jr. ................. 53/417 |
| D417,388 S | | 12/1999 | Kawahara |

* cited by examiner

*Primary Examiner*—Kurt Rowan

(57) ABSTRACT

A fish lure making system for making a fishing lures for fish eggs and other baits. The fish lure making system includes a tying means for making the fishing lures. A spool is provided for holding the tying means. A sack is provided having an access opening designed for holding fish eggs. A housing having an interior is provided for selectively receiving and holding the sack. The housing includes a pair of clip portions and a securing portion. The spool is rotatably mounted between the pair of clip portions of the housing. The securing portion of the housing includes an aperture extending through the housing for receiving the sack. A securing assembly is slidably positioned in the interior of the housing for cinching the sack positioned through the aperture while user ties the sack blocking the access opening of the sack.

15 Claims, 4 Drawing Sheets

FISH LURE MAKING SYSTEM

BACKGROUND OF THE INVENTION

1. Field of the Invention

The present invention relates to fish lure making devices and more particularly pertains to a new fish lure making system for making fishing lures for fish eggs and other baits.

2. Description of the Prior Art

The use of fish lure making devices is known in the prior art. More specifically, fish lure making devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,803,759; U.S. Pat. No. 4,622,723; U.S. Pat. No. 4,188,686; U.S. Pat. No. Des. 417,388; U.S. Pat. No. 4,763,388; and U.S. Pat. No. 3,886,679.

While these devices fulfill their respective, particular objectives and requirements, the aforementioned patents do not disclose a new fish lure making system. The inventive device includes a tying means for making the fishing lures. A spool is provided for holding the tying means. A sack is provided having an access opening designed for holding fish eggs. A housing having an interior is provided for selectively receiving and holding the sack. The housing includes a pair of clip portions and a securing portion. The spool is rotatably mounted between the pair of clip portions of the housing. The securing portion of the housing includes an aperture extending through the housing for receiving the sack. A securing assembly is slidably positioned in the interior of the housing for cinching the sack positioned through the aperture. A user ties the sack blocking the access opening of the sack.

In these respects, the fish lure making system according to the present invention substantially departs from the conventional concepts and designs of the prior art, and in so doing provides an apparatus primarily developed for the purpose of making a fishing lures for fish eggs and other baits.

SUMMARY OF THE INVENTION

In view of the foregoing disadvantages inherent in the known types of fish lure making devices now present in the prior art, the present invention provides a new fish lure making system construction wherein the same can be utilized for making a fishing lures for fish eggs and other baits.

The general purpose of the present invention, which will be described subsequently in greater detail, is to provide a new fish lure making system apparatus and method which has many of the advantages of the fish lure making devices mentioned heretofore and many novel features that result in a new fish lure making system which is not anticipated, rendered obvious, suggested, or even implied by any of the prior art fish lure making devices, either alone or in any combination thereof.

To attain this, the present invention generally comprises a tying means for making the fishing lures. A spool is provided for holding the tying means. A sack is provided having an access opening designed for holding fish eggs. A housing having an interior is provided for selectively receiving and holding the sack. The housing includes a pair of clip portions and a securing portion. The spool is rotatably mounted between the pair of clip portions of the housing. The securing portion of the housing includes an. aperture extending through the housing for receiving the sack. A securing assembly is slidably positioned in the interior of the housing for cinching the sack positioned through the aperture. A user ties the sack blocking the access opening of the sack.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish lure making system apparatus and method which has many of the advantages of the fish lure making devices mentioned heretofore and many novel features that result in a new fish lure making system which is not anticipated, rendered obvious, suggested, or even implied by any of the prior art fish lure making devices, either alone or in any combination thereof.

It is another object of the present invention to provide a new fish lure making system which may be easily and efficiently manufactured and marketed.

It is a further object of the present invention to provide a new fish lure making system which is of a durable and reliable construction.

An even further object of the present invention is to provide a new fish lure making system which is susceptible of a low cost of manufacture with regard to both materials and labor, and which accordingly is then susceptible of low prices of sale to the consuming public, thereby making such fish lure making system economically available to the buying public.

Still yet another object of the present invention is to provide a new fish lure making system which provides in the apparatuses and methods of the prior art some of the advantages thereof, while simultaneously overcoming some of the disadvantages normally associated therewith.

Still another object of the present invention is to provide a new fish lure making system for making a fishing lures for fish eggs and other baits.

Yet another object of the present invention is to provide a new fish lure making system which includes a tying means for making the fishing lures. A spool is provided for holding the tying means. A sack is provided having an access opening designed for holding fish eggs. A housing having an interior is provided for selectively receiving and holding the sack. The housing includes a pair of clip portions and a securing portion. The spool is rotatably mounted between the pair of clip portions of the housing. The securing portion of the housing includes an aperture extending through the housing for receiving the sack. A securing assembly is slidably positioned in the interior of the housing for cinching the sack positioned through the aperture. A user ties the sack blocking the access opening of the sack.

Still yet another object of the present invention is to provide a new fish lure making system that permits a user to make fishing lures while streamside. The new fish lure making system provides a user with a device that permits the user to accomplish the difficult task of holding a sack and tying it closed with only two hands.

Even still another object of the present invention is to provide a new fish lure making system that saves a user money by reducing the loss of fishing eggs and other baits that fall out of a sack while trying to hold the sack and tying it closed. The new fish lure making system cinches closed the sack preventing the bait from spilling out.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
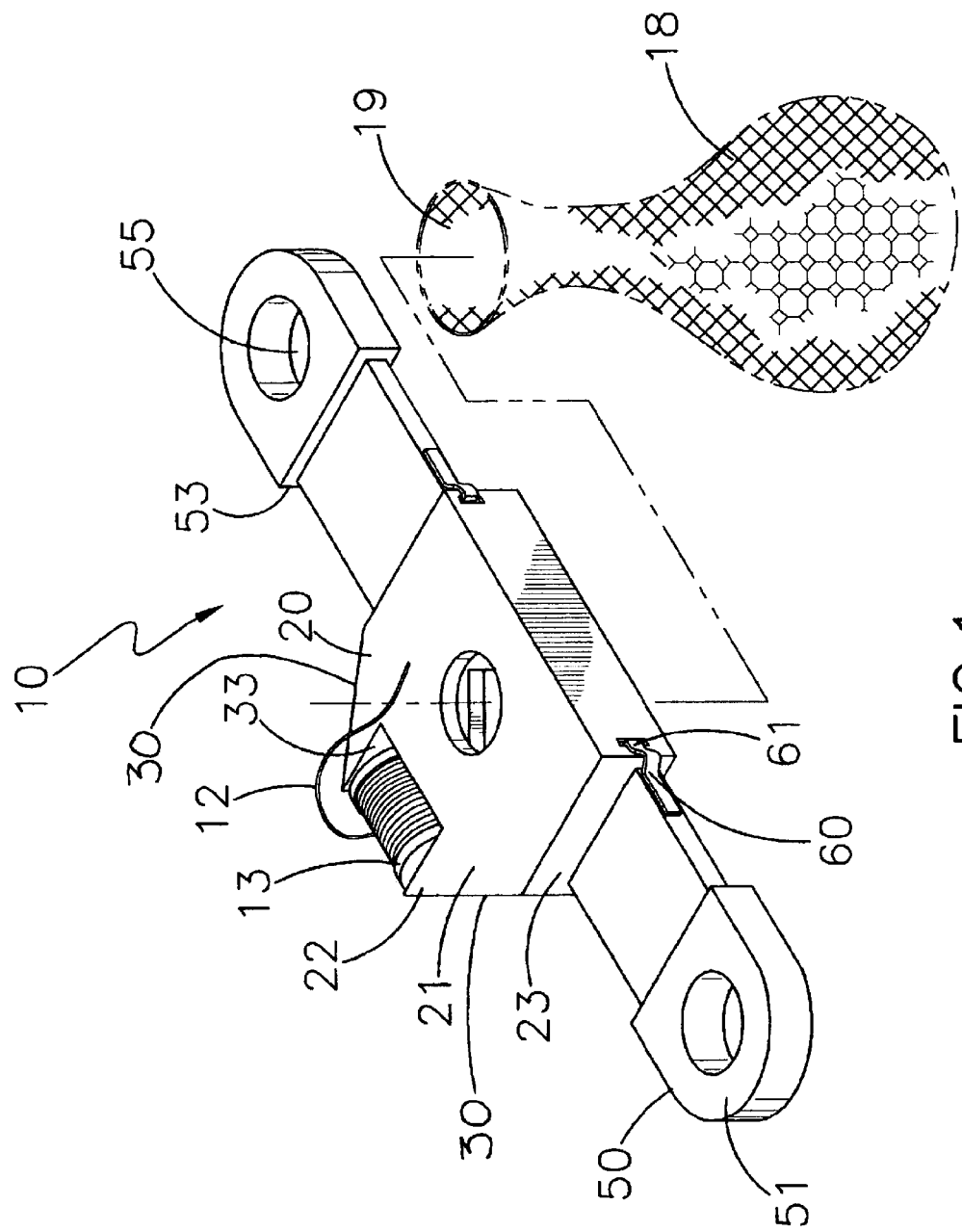
FIG. 1 is a schematic perspective view of a new fish lure making system according to the present invention.
Figure 2:
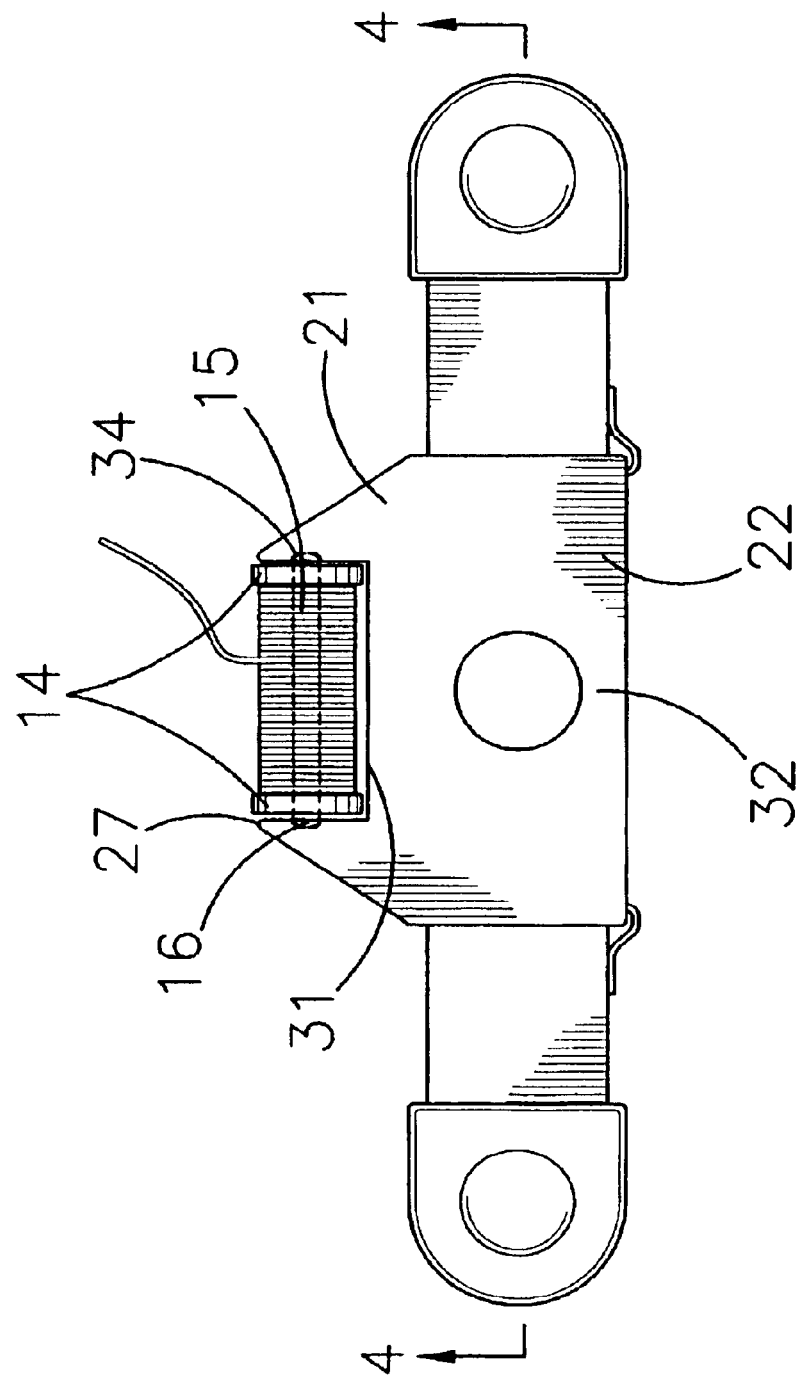
FIG. 2 is a schematic top view of the present invention.
Figure 3:
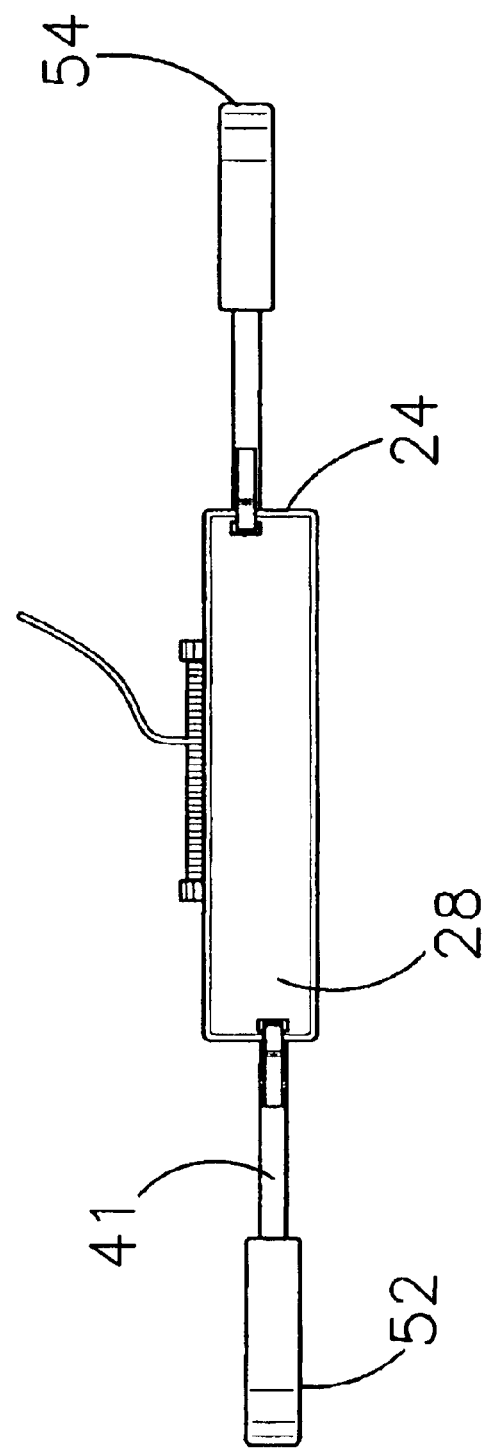
FIG. 3 is a schematic frontal view of the present invention.

With reference now to the drawings, and in particular to FIGS. 1 through 4 thereof, a new fish lure making system embodying the principles and concepts of the present invention and generally designated by the reference numeral 10 will be described.

As best illustrated in FIGS. 1 through 4, the fish lure making system 10 generally comprises a tying means 12 for making the fishing lures. The tying means 12 may comprise a generally flexible material such as, for example, a fishing line, a string, thread or a twine.

A spool 13 is provided for holding the tying means 12. The spool 13 includes a pair of end flanges 14 and a shaft 15 extending between and being coupled to each of the end flanges 14. A pair of protruding members 16 may be mounted to and extending away from a central portion of each of the end flanges 14.

A sack 18 designed for holding a plurality of fish eggs or other types of bait is also provided. The sack 18 has an access opening 19 for putting the fish eggs and other bait into the sack 18. In one embodiment of the present invention, the sack 18 may comprise a panel designed for permitting a scent of the fish eggs or other bait to leave the sack and attract fish. In one embodiment of the present invention, the sack 18 may comprise a cloth material.

A housing 20 is provided for selectively receiving and holding the sack 18. The housing 20 includes a securing portion 21 for holding the sack 18 and a pair of clip portions 22 for holding the spool 13. The housing 20 may measure approximately three-eighths of an inch thick.

The securing portion 22 of the housing 20 includes a first end 23, a second end 24, a top wall 25 and a bottom wall 26. A first side wall 27 and a second side wall 28 extend between the top 25 and bottom 26 walls defining an interior 29 of the housing 20. The housing 20 includes a longitudinal axis extending through the first 23 and second 24 ends of the housing 20. The top 25 and bottom 26 walls of the housing 20 may be spaced apart by one-quarter of an inch defining the interior 29 of the housing 20.

The housing 20 includes an aperture 32 extending through the top 25 and bottom 26 walls of the housing 20 for selectively receiving the sack 18. In one embodiment of the present invention, the sack 18 is positioned through the aperture 32 such that the access opening 19 is positioned generally adjacent to the top wall 25. The aperture 32 may have a diameter measuring approximately three-quarters inch thick. However, other sized diameter apertures 32 may also be employed.

The housing 20 may include a pair of angled side walls 30 extending between the first side wall 27 and the first 23 and second 24 ends of the housing 20. The first side wall 27 of the housing 20 may include an channel 31 extending into the first side wall 27 of the housing 20 defining the pair of spaced clip portions 22. The channel 31 may have a width measuring approximately one and one-eighth inches.

The channel 31 may extend from the first side wall 27 toward the aperture 32. Each of the clip portions 22 may include an inner surface 33. The inner surface 33 of each of the clip portions may include a depression 34 extending therein for selectively receiving each of the protruding portions 16 of the spool 13. In one embodiment of the present invention, the spool 13 is rotatably mounted between the clip portions 22 of the housing 20.

The first 23 and second 24 ends of the housing 20 may include elongated openings 35 extending into the interior 29 of the housing 20. In one embodiment of the present invention, the opening 35 of the first end 23 of the housing 20 is positioned generally adjacent to the bottom wall 26 of the housing 20. The opening 35 of the second end 24 of the housing 20 is positioned generally adjacent to the top wall 25 of the housing 20.

A securing assembly 40 is slidably positioned in the interior 29 of the housing 20 for holding the sack 18 extending through the aperture 32 of the housing 20. The securing assembly 40 may include a pair of elongated arm members 41. Each of the arm members 40 includes first 49 and second 42 opposed ends and upper 43 and lower 44 surfaces. The first end 49 of each of the arm members 41 is slidably positioned in the interior 29 of the housing 20.

Figure 4:
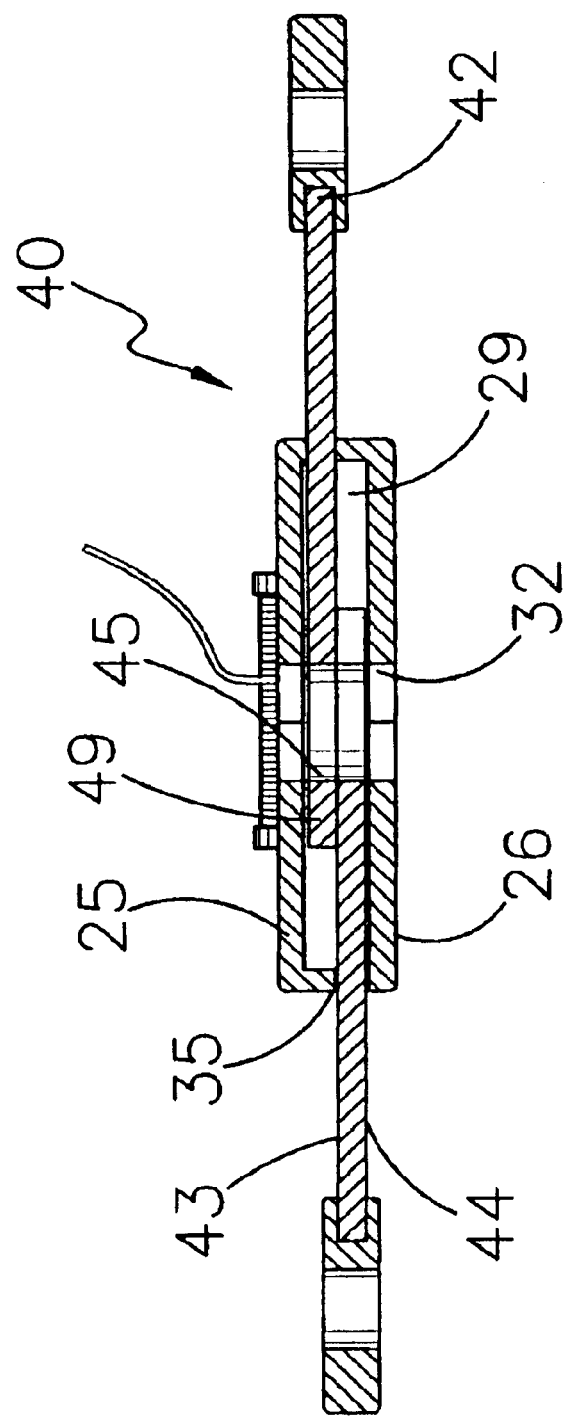
FIG. 4 is a schematic cross sectional view of the present invention taken along line 4—4 of FIG. 2.

As illustrated in FIG. 4, each of the arm members 41 may be positioned generally adjacent to each other in a stacked orientation. The second end 42 of each of the arm members 41 extends out of one of the openings 35 of the first 23 and second 24 ends of the housing 20. Additionally, each of the arm members 41 is designed to slide past each other. The upper and lower surfaces of each of the arm members 41 include a hole 45 extending therethrough. Each of the holes 45 may be positioned generally adjacent to the first end 49 of each of the arm members 41. The openings 35 may measure approximately seven-eighths of inch in diameter.

The pair of arm members 41 is positionable between an unsecured position and a secured position. In one embodiment of the present invention, the unsecured position is characterized by the holes 45 in each of the arm members 41 are in registration with the aperture 32 in the housing 20. In one embodiment of the present invention, the sack 18 is inserted through the aperture 32 of the housing 20 and through the holes 45 of each of the arm members 41. The secured position is characterized by each of the arm members 41 sliding past each other such that the holes 45 of each of the arm members 41 eclipse each other constricting the access opening 19 of the sack 18. In one embodiment of the present invention, a user uses the tying means 12 to close the access opening 19 of the sack 18.

A pair of end member 50 may be mounted on the second end 42 of each of arm members 41 for moving the pair of arm members 41 between the unsecured position and the secured position. Each of the end members 50 includes upper 51 and lower 52 surfaces, a first end 53 and a second end 54. Each of the end members 50 includes an opening 55 extending through the upper 51 and lower 52 surfaces of each of the end members 50 for receiving a finger and thumb of a user. The second end 42 of each of the arm members 41 may be mounted on the first end 53 of each of the end members 50. The second end 54 of each of the end members 50 may be generally arcuate A fastening means 60 may be pivotally mounted on each of the arm members 41 for securing each of the arm members 41 in the secured position. The fastening means 60 includes a generally arcuate end 61 that is releaseably fastened to the second side wall 28 of the housing 20 when the pair of arm members 41 are in the secured position.

In use, the fishing eggs are inserted into the access opening 19 of the sack 18. The sack 18 is then inserted through the aperture 32 of the housing 20 and through the holes 45 of each of the arm members 41 such that the access opening 19 is positioned generally adjacent to the top wall 25 of the housing 20. The user then moves each of the arm members 41 from the unsecured position toward the secured position cinching the access opening 19 of the sack 18 and releasably securing the sack 18 in the housing. A user may then use a free hand to use the tying means 12 to tie the access opening 19 of the sack 18 closed. Each of the arm members 41 is then moved from the secured position toward the unsecured position releasing the sack 18 from the housing.

If a user needs to use both hands the securing means 60 may be releasably secured to the housing 20 in the secured position. Once in the secured position a user may use both hands without worrying about losing the fish eggs in the sack 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for making a fishing lure using a plurality of fish eggs, said system comprising:

an elongate flexible member for tying the fishing lure;

a spool for holding said elongate flexible member;

a sack having an access opening adapted for holding fish eggs;

a housing having an interior for selectively receiving and holding said sack, said housing including a pair of clip portions and a securing portion, wherein said spool is rotatably mounted between said pair of clip portions of said housing, said securing portion of said housing having an aperture extending through said housing for receiving said sack; and a securing assembly being slidably positioned in said interior of said housing for cinching said sack extending through said aperture;

wherein said housing has a channel that extends into said housing to thereby define said pair of clip portions of said housing, said spool being positioned in said channel of said housing.

2. The system of claim 1, wherein said securing portion of said housing has a first end, a second end, a top wall, a bottom wall, a first side wall, and a second side wall defining said interior of said housing, said channel extending into said first side wall of said housing.

3. The system of claim 1, wherein said a securing assembly includes a pair of elongated arm members being slidably mounted in said interior of said housing and extending out of said housing, said pair of arm members being adapted for cinching said sack.

4. The system of claim 3, wherein each of said arm members has first and second opposite ends, said first end of each of said arm members being slidably positioned in said interior of said housing, said second end of each of said arm members extending out opposite sides of said housing.

5. The system of claim 4, wherein each of said arm members has a hole extending therethrough for selectively receiving said sack extending through said aperture of said housing.

6. A system for making a fishing lure using a plurality of fish eggs, said system comprising;

an elongate flexible member for tying the fishing lure;

a spool for holding said elongate flexible member;

a sack having an access opening adapted for holding fish eggs;

a housing having an interior for selectively receiving and holding said sack, said housing including a pair of clip portions and a securing portion, wherein said spool is rotatable mounted between said pair of clip portions of said housing, said securing portion of said housing having an aperture extending through said housing for receiving said sack; and a securing assembly being slidably positioned in said interior of said housing for cinching said sack extending through said aperture;

wherein said securing portion of said housing has a first end, a second end, a top wall, a bottom wall, a first side wall, and a second side wall defining said interior of said housing; and wherein said housing has a pair of angled side walls extending between said first side wall and said first and second ends of said housing, wherein said first side wall of said housing has a channel extending into said first side wall of said housing defining said pair of clip portions of said housing.

7. The system of claim 6, wherein said spool has a pair of end flanges and a shaft extending between and coupled to each of said end flanges, each of said end flanges having a protruding portion; and each of said clip portions has an inner surface, said inner surface of each of said clip portions having a depression for selectively receiving said pair of protruding portions of said spool.

8. The system of claim 6, wherein said a securing assembly includes a pair of elongated arm members being slidably mounted in said interior of said housing and extending out of said housing, said pair of arm members being adapted for cinching said sack.

9. The system of claim 8, wherein each of said arm members has first and second opposite ends, said first end of each of said arm members being slidably positioned in said interior of said housing, said second end of each of said arm members extending out opposite sides of said housing.

10. The system of claim 9, wherein each of said arm members has a hole extending therethrough for selectively receiving said sack extending through said aperture of said housing.

11. A system for making a fishing lure using a plurality of fish eggs, said system comprising:

an elongate flexible member for tying the fishing lure;

a spool for holding said elongate flexible member;

a sack having an access opening adapted for holding fish eggs;

a housing having an interior for selectively receiving and holding said sack, said housing including a pair of clip portions and a securing portion, wherein said spool is rotatably mounted between said pair of clip portions of said housing, said securing portion of said housing having an aperture extending through said housing for receiving said sack; and a securing assembly being slidably positioned in said interior of said housing for cinching said sack extending through said aperture;

wherein said a securing assembly includes a pair of elongated arm members being slidably mounted in said interior of said housing and extending out of said housing, said pair of arm members being adapted for cinching said sack;

wherein each of said arm members has first and second opposite ends, said first end of each of said arm members being slidably positioned in said interior of said housing, said second end of each of said arm members extending out opposite sides of said housing;

wherein said pair of arm members is movable between an unsecured position and an secured position, wherein said unsecured position is characterized by said holes in each of said arm members being in substantial registration with said aperture in said housing such that said sack is insertable through said apertures of said housing and through said holes of each of said arm members to form said sack, wherein said secured position is characterized by each of said arm members sliding past each other such that said holes of each of said arm members eclipse each other and constrict said opening of said sack, wherein a user ties said panel adjacent to said access opening of said sack to close said access opening.

12. The system of claim 11, additionally including a pair of end members being mounted on said second end of each of arm members for moving said pair of arm members between said unsecured position and said secured position.

13. The system of claim 12, wherein each of said end members has an opening extending through each of said end members for receiving a finger and thumb of a user.

14. The system of claim 11, additionally including a fastening means being pivotally mounted on each of said arm members for securing each of said arm members in said secured position, each of said fastening means being releasably fastened to said housing.

15. The system of claim 14, wherein said fastening means has a generally arcuate end, said arcuate end of each of said fastening means being releaseably fastened to said housing.

\* \* \* \* \*